(12) United States Patent
Eryilmaz et al.

(10) Patent No.: US 12,710,097 B2
(45) Date of Patent: Aug. 18, 2026

(54) SLICK DURABLE SEAL

(71) Applicant: UCHICAGO ARGONNE, LLC, Chicago, IL (US)

(72) Inventors: Osman L. Eryilmaz, Plainfield, IL (US); Vanessa DaSilva, Countryside, IL (US); Ali Erdemir, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 648 days.

(21) Appl. No.: 18/107,269

(22) Filed: Feb. 8, 2023

(65) Prior Publication Data

US 2023/0250877 A1 Aug. 10, 2023

Related U.S. Application Data

(60) Provisional application No. 63/308,314, filed on Feb. 9, 2022.

(51) Int. Cl.

| | |
|---|---|
| ***F16J 15/16*** | (2006.01) |
| ***C08K 3/04*** | (2006.01) |
| ***C08K 3/22*** | (2006.01) |
| ***C10M 107/02*** | (2006.01) |
| *C10N 40/34* | (2006.01) |

(52) U.S. Cl.

CPC ............... *F16J 15/162* (2013.01); *C08K 3/04* (2013.01); *C08K 3/22* (2013.01); *C10M 107/02* (2013.01); *C08K 2201/005* (2013.01); *C10M 2205/003* (2013.01); *C10N 2040/34* (2013.01)

(58) Field of Classification Search

CPC . F16J 15/162; C08K 3/04; C08K 3/22; C08K 2201/005; C10M 107/02; C10M 2205/003; C10N 2040/34

See application file for complete search history.

(56) References Cited

U.S. PATENT DOCUMENTS

2013/0085088 A1 4/2013 Erdemir et al.
2016/0340602 A1 11/2016 Erdemir et al.
2019/0314803 A1* 10/2019 Erdemir ............... B01J 37/0225

FOREIGN PATENT DOCUMENTS

CN 103435947 A * 12/2013
CN 104662300 A * 5/2015 .......... F04C 18/0215

OTHER PUBLICATIONS

"PTFE Seal Design Guide," Parker Hannifin Corporation, 96 pages (2011).

* cited by examiner

*Primary Examiner* — Robert S Walters, Jr.
(74) *Attorney, Agent, or Firm* — Foley & Lardner LLP

(57) ABSTRACT

A sealing system having a seal engagable with a reciprocating component. The seal includes a catalytic additive that catalyzes the formation of a carbon tribolayer. The tribolayer provides for a lubricous environment while maintaining seal integrity and continued lubrication during active use (reciprocation).

5 Claims, 1 Drawing Sheet

SLICK DURABLE SEAL

CROSS-REFERENCE TO RELATED APPLICATIONS

This application claims priority to and the benefit of U.S. Provisional Patent Application No. 63/308,314, filed Feb. 9, 2022, the content of which is incorporated by reference in its entirety.

STATEMENT REGARDING FEDERALLY SPONSORED RESEARCH

This invention was made with government support under Contract No. DE-AC02-06CH11357 awarded by the U.S. Department of Energy, Office of Science, Office of Basic Energy. The United States government has certain rights in this invention.

BACKGROUND

Seals serve vital roles in many systems. Seals are utilized to joint two components together, often serving to also retain a material within the system. In many applications for mechanical devices, seals additionally are exposed to the relative movement of the attendant forces.

One such force of particular focus for many systems is friction. Friction is a well-known problematic aspect of a number of important mechanical systems in the modern world. Friction involving a seal occurs in many systems, and not all lubrication schemes will function in every such system or application of that system. A frequently desired outcome for mechanical systems is to reduce friction as much as practical. The reduction in friction is often accompanied by changes in other important properties, and in particular for seals, in their efficacy in providing the sealing function.

In fact, a large portion of these losses are found in machine systems, such as sliding and/or rolling contacts, where surfaces rub against each other. Traditionally, organic, synthetic, and mineral oils have been in use to reduce wear and frictional energy loss in mechanical components in contact. In these contacts, both the viscosity of the oil-based lubricant, as well as the lubricant additives, play an important role in reducing frictional losses as well as the performance over time characteristics. It is well known that oil-based lubricants themselves experience internal friction (traction) as they shear between sliding parts. Because of this, lubricant additives, such as viscosity and surface modifiers, are often used to reduce energy losses. In many applications of seals where relative movement is occurring, a failure caused by insufficient lubrication can result in a catastrophic failure as the seal fails and material that was being sealed leaks. Thus, a risk in the use of liquid lubricants is that if the if the viscosity of the lubricant drops too low or the liquid evaporates or boils off, or if sufficient additive concentrations are not maintained than surface-on-seal contact can occur without the benefit of the lubrication regime. This reliance on liquid lubricants in a contact-passed applications causes increased risk of a failure event when temperature or pressures exceed threshold values.

Sliding systems such as those common in reciprocating compressors, utilize two interacting surfaces. Sliding systems also include other physical mechanisms, such as the use of a screw-type system using rotational forces. In the case of reciprocating compressors, a first interacting surface is that of the seal and the second interacting surfaces is the reciprocating component, typically a rod. Current seals are typically made of a polymer material and additives, commonly polytetrafluoroethylene ("PTFE"), and solid additives, such as carbon, glass, molybdenum sulfide, or similar materials). In some systems, such as those involving hydrocarbons, the material sealed within the system may be reactive such that a catalytically active material can be integrated to provide for the formation of a lubricious coating. The use of a coating on the reciprocating component can facilitate such a catalyzed lubricous coating formation. However, many seals, including commonly use PTFE seals exhibit undesirable behavior in operation, such as with the material of the seal being transferred to the reciprocating component, essentially blocking the catalytic activity at those locations, thus preventing formation of the lubricious coating.

Thus, there is a need for a sealing system that provides a seal and reciprocating component that provide for a lubricous environment while maintaining seal integrity and continued lubrication during active use (reciprocation).

SUMMARY

One embodiment relates to a method of forming a low friction wear surface. The method comprises providing a seal and reciprocating component configured to slidably reciprocating therein; exposing the seal and reciprocating component to a hydrocarbon lubricant; and forming a carbon tribolayer coating on one or both of the seal and the reciprocating component.

In another embodiment, a low friction apparatus is provided. The apparatus includes a seal having a bulk material and a catalytic additive. A counter surface component comprising steel is slidably engagable with the seal. A hydrocarbon is exposed to the seal, wherein slidable communication between the seal and the counter surface in the presence of the hydrocarbon forms a tribolayer on the counter surface.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE FIGURES

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

DETAILED DESCRIPTION

Following below are more detailed descriptions of various concepts related to, and embodiments of, robust lubricious coatings formed on the surface of a seal due to catalytic activity. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. As used herein, unless otherwise indicated, % or percentage content of a material refers to weight percentage.

One embodiment relates to a seal having lubricious properties. In a particular application, seals as described herein may be used with hydrocarbon systems, for example as a sealing component in a reciprocating system, such as a natural gas compressor or oil lubricated sealing system. For example, such seals may be engaged with reciprocating components of a natural case gas compressor.

Figure 1:
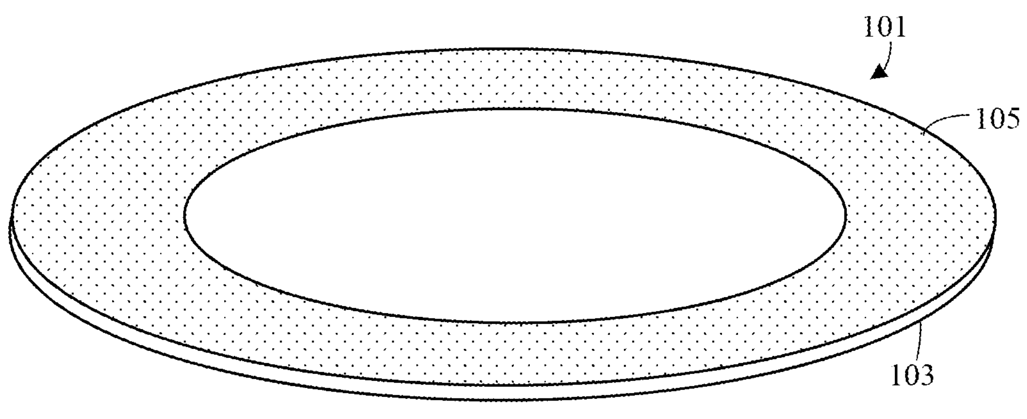
FIG. 1 depicts a seal having a bulk material and additives.

The seal comprises a bulk material. FIG. 1 shows the seal 101 with bulk material 103. The bulk material may be of a type commonly used for seals, including but not limited to polytetrafluoroethylene ("PTFE"), polychlorotrifluoroethylene ("PFCTFE"), polyacrylonitrile ("PAN"), polycarbonate ("PC"), polyether etherketone ("PEEK"), polyimide ("PI"), polyethylene ("PE"), including ultra-high molecular weight polyethylene ("UHMW-PE"). In some embodiments, any bulk seal material sufficient to provide polymeric matrix as a carrier for the additives may be used. The bulk material may be utilized as a powder in the formation of the seal. Bulk material may be prepared in accordance with known production methods.

The seal further includes one or more additives. FIG. 1 shows the seal 101 with additives, 105 embedded in the bulk material 103. Traditional additives such as glass, glass fibers, molybdenum disulfide, hexagonal boron nitrode, bronze may be included to provide desired mechanical properties. In addition, the one or more additives may include one or more catalytic additives, such as but not limited to metal oxides, including oxides of copper, nickel and vanadium. Specific embodiments utilize catalytic additives selected from the group consisting of vanadium pentoxide, tungsten trioxide, molybdenum trioxide, niobium dioxide, rhenium dioxide, tantalum pentoxide, and titanium dioxide. The catalytic additives may be integrated into the bulk material.

As used herein, the term "catalytically active" means that the additive catalyzes the decomposition of a hydrocarbon, for example, cracks the long-chain hydrocarbons included an oil into smaller hydrocarbons such as dimers and trimers, catalyzes the breaking of C—H and/or C—C bonds of natural gas hydrocarbon molecules. The catalytic additive facilitates the formation of a carbon tribolayer from the hydrocarbon material.

Figure 2:
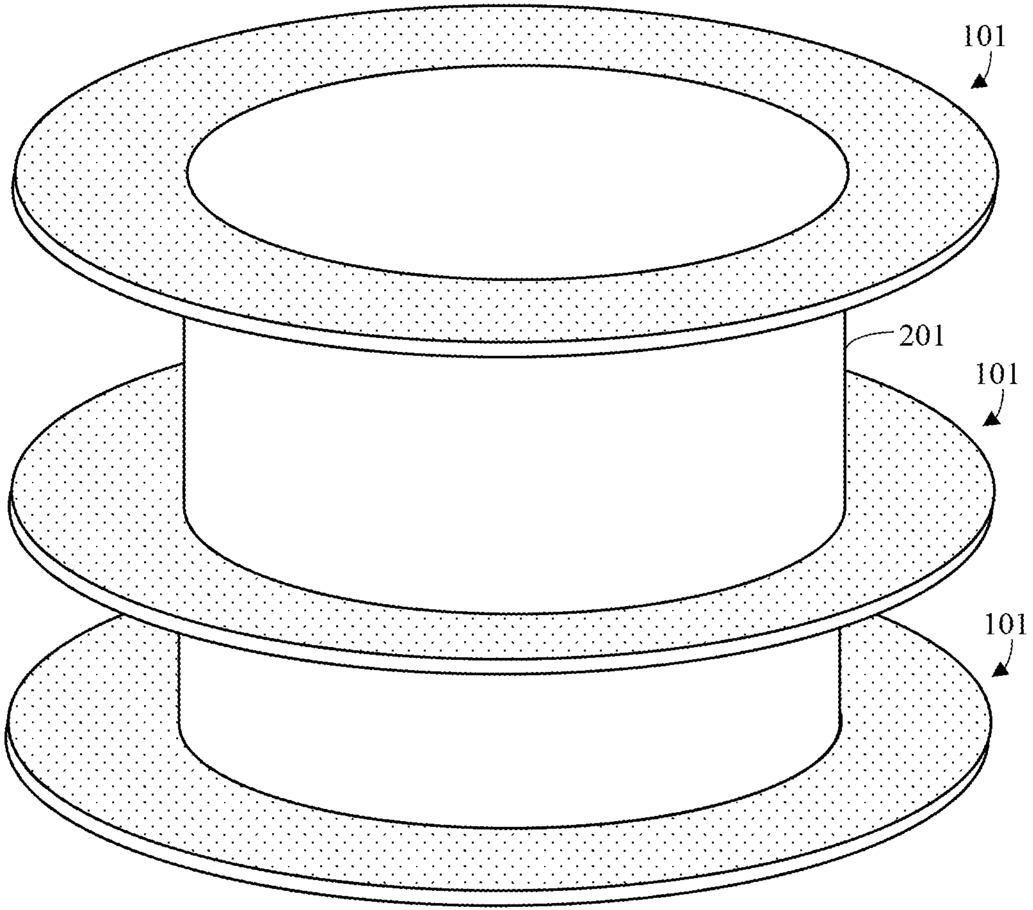
FIG. 2 illustrates one embodiment of a three seals interacting with a reciprocating member Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

In some embodiments, a lubricant composition is utilized in the reciprocating component to provide a traditional lubrication source, for example an oil including a plurality of long-chain hydrocarbon molecules. FIG. 2 shows partial view for one embodiment of a reciprocating member 201 that is sliding within three seals 101. The seals have internal apertures, for example may be shaped like an "O" ring.

Any suitable oil can be used. In various embodiments, the oil can include a paraffinic oil, a naphthenic oil or an aromatic oil. In some embodiments, the oil can include a petroleum based oil or otherwise a mineral oil. In some embodiments, the oil can include a vegetable oil or a synthetic oil, such as a hydrogenated polyalphaolefin ("PAO") oil, an ester based oil, a silicone based oil, plant or vegetable oils, polyalkylene glycols or a fluorocarbon based oil. In some embodiments, any one of a Group I oil, a Group II oil, a Group III oil, a Group IV oil or a Group V oil, as defined by the American Petroleum Institute ("API"), can be used. In particular embodiments, the oil includes a PAO oil. In various embodiments, the oil can include fully formulated oils. As used herein, the term "fully formulated" refers to oils that include any pre-prepared oil formulation which can be used as is. Such fully formulated oils can include, for example commercially available natural, semi-synthetic or synthetic oils (e.g., commercially available oils.

In use, the hydrocarbon is broke down in the presence of the catalytic additive resident in the seal to form a tribological film or coating. The tribological coating or film in combination with the oil in the lubricant composition provides a lower coefficient of friction, and a more stable and long lasting lubricant. Seals in accordance with the embodiments described herein exhibit a substantial reduction in coefficient of friction (such as up to 3 times) and concurrent reduction in wear (by up to 6 times based on wear life) compared to industry standard seals.

In one embodiment, the seal is formed by a cold press process. The cold pressed seal blanks are then cured to provide a final PTFE product. The catalytic additives may in the form of a powder, such as having an average particle size of 25 $\mu m \leq 100$ $\mu m$.

Further, the one or more additives may include a particulate additive, such as molybdenum sulfide, graphite, boron nitride tungsten trioxide, molybdenum trioxide, niobium dioxide, rhenium dioxide, tantalum pentoxide. The catalytic additive might itself decompose on a surface through rubbing action to yield a decomposition product that is lubricous, that is reduces the coefficient of friction for the seal. For example, it is believed that fine powder of the catalytic additive catalyze the hydrocarbon molecules under high pressure and shear conditions of reciprocating seal interface and fragment them into smaller fragments from which the DLC-like tribolayer results.

In one embodiment, the seal comprises 70% to 80% (e.g., % inclusive of all ranges and values therebetween) of the bulk material such as 75%, and 20-30% of additives, such as vanadium pentoxide 11% to 25% (e.g., % inclusive of all ranges and values therebetween), such as 25%, and further additives for physical properties, such as graphite, of 2% to 11% (e.g., % inclusive of all ranges and values therebetween), such as 2%. Further, the seal may consist essentially of PTFE 70% to 80%, such as 75%, vanadium pentoxide 11% to 25%, such as 23%, and graphite of 2% to 11%, such as 2%.

Certain embodiments of the seal described herein facilitate the formation of a carbon coating on the seal and or the counter surface, such as the reciprocating component. The formation of the carbon coating may be due to the formation of fragments from the lubricant material, such as a portion of the long-chain hydrocarbons of the oil under the influence of mechanical and/or thermal loading. For example, the mechanical loading at which the metal-organic additive fragments the long-chain hydrocarbons can be in the range of 20 MPa to 5 GPa (e.g., 20 MPa, 40 MPa, 60 MPa, 80 MPa, 100 MPa, 200 MPa, 300 MPa, 400 MPa, 500 MPa, 600 MPa, 700 MPa, 800 MPa, 900 MPa, 1 GPa, 2 GPa, 3 GPa, 4 GPa or 5 GPa, inclusive of all ranges and values therebetween). Furthermore, the thermal loading or temperature at which the metal-organic additive fragments the long-chain hydrocarbons can be in the range of 20 degrees Celsius to 300 degrees Celsius (e.g., 20, 30, 40, 50, 60, 70, 80, 90, 100, 120, 140, 160, 180, 200, 220, 240, 260, 280 or 300 degrees Celsius, inclusive of all ranges and values therebetween).

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." Any ranges cited herein are inclusive.

The terms "substantially" and "about" used throughout this Specification are used to describe and account for small fluctuations. For example, they may refer to less than or equal to ±5%, such as less than or equal to ±2%, such as less than or equal to +1%, such as less than or equal to +0.5%, such as less than or equal to ±0.2%, such as less than or equal to +0.1%, such as less than or equal to +0.05%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed:

1. A method of forming a low friction wear surface comprising:

providing a seal, having a bulk material and an additive, and reciprocating component configured to slidably reciprocating thereon;

exposing the seal and reciprocating component to a hydrocarbon; and forming a carbon tribolayer coating on one or both of the seal and the reciprocating component;

wherein the additive comprises vanadium pentoxide.

2. The method of claim 1, wherein the additive has an average particle size of 25 μm≤100 μm.

3. The method of claim 1, wherein the bulk material is selected from the group consisting of polytetrafluoroethylene ("PTFE"), polychlorotrifluoroethylene ("PFCTFE"), polyacrylonitrile ("PAN"), polycarbonate ("PC"), polyether etherketone ("PEEK"), polyimide ("PI") or polyethylene ("PE").

4. The method of claim 1, wherein the hydrocarbon comprises a Group I oil, a Group II oil, a Group III oil, a Group IV oil or a Group V oil.

5. The method of claim 1, wherein forming the carbon tribolayer further comprises breaking down a portion of the hydrocarbon through catalytic interaction with the additive in the seal.

* * * * *